April 4, 1944.  L. E. COWEY  2,346,010

AIRCRAFT LANDING GEAR

Filed May 18, 1942  2 Sheets-Sheet 1

INVENTOR
Leonard Eugene Cowey
BY
Haseltine, Lake & Co.
ATTORNEYS

April 4, 1944.                L. E. COWEY                2,346,010
                          AIRCRAFT LANDING GEAR
                       Filed May 18, 1942        2 Sheets-Sheet 2

Leonard Eugene Cowey
                INVENTOR
BY
Haseltine, Lake & Co.
                ATTORNEYS Patented Apr. 4, 1944

2,346,010

UNITED STATES PATENT OFFICE 2,346,010

AIRCRAFT LANDING GEAR

Leonard Eugene Cowey, Kew Gardens, England

Application May 18, 1942, Serial No. 443,358
In Great Britain May 8, 1941

1 Claim. (Cl. 244—100)

The present invention relates to aircraft landing gear of the kind including two main landing wheels arranged in their normal or substantially normal positions and a third wheel disposed to the rear of the main wheels and situated either beneath the tail of the aircraft or at a point between the tail and main landing wheels. Such a construction of landing gear forms the subject of British Patent No. 463,401.

With such landing gear, an aircraft so fitted can be landed in a substantially horizontal position, i. e., in a position approximating to normal level flight as distinct from a "tail down" position, and although an aircraft fitted with that type of landing gear can be "flown off" with the tail in the raised position which it assumes when landing, it is desirable that a quicker "take-off" should be obtainable if necessary, or when landing it should be possible to land in the orthodox tail down position. This is desirable particularly in the case of trainer aircraft where it is necessary to instruct a pupil in both forms of landing technique.

One of the objects of the invention is to evolve an improved form of mounting for the third wheel which will permit of it being raised or maintained when required into or in an alternative position.

According to the present invention, in an aircraft having a landing gear of the kind including two main landing wheels arranged in their normal or substantially normal positions, and a third wheel disposed to the rear of the main wheels situated beneath the tail of the aircraft or at a point between the tail and main landing wheels, the third wheel is carried by a mounting which is adjustable in height to permit of the aircraft, when landing, assuming an orthodox tail down position, a position approximating to that of normal level flight or an intermediate position as desired.

When providing a third wheel for enabling an aircraft to be landed in a "tail up" position, it is preferable to move the main landing wheels further forward of the centre of gravity of the aircraft, thereby enabling the wheel brakes to be more firmly applied without risk of the aircraft nosing over when landing, but in the case of an aircraft wherein the main landing wheels are carried by undercarriage legs attached to the wings, for example, to the leading main spar, difficulty is experienced in effecting such an alteration.

According to a further feature of the invention, each main undercarriage wheel is attached to the forward end of an arm which is pivotally mounted at its rearward end on a bracket or other member carried by the main undercarriage leg or other member which normally carries a main landing wheel, said arm being also pivotally connected at a point intermediate its length to a moving part of the shock absorbing mechanism.

In order that the said invention may be clearly understood and readily carried into effect, the same will now be described more fully with reference to the accompanying drawings, wherein.

Figure 1:
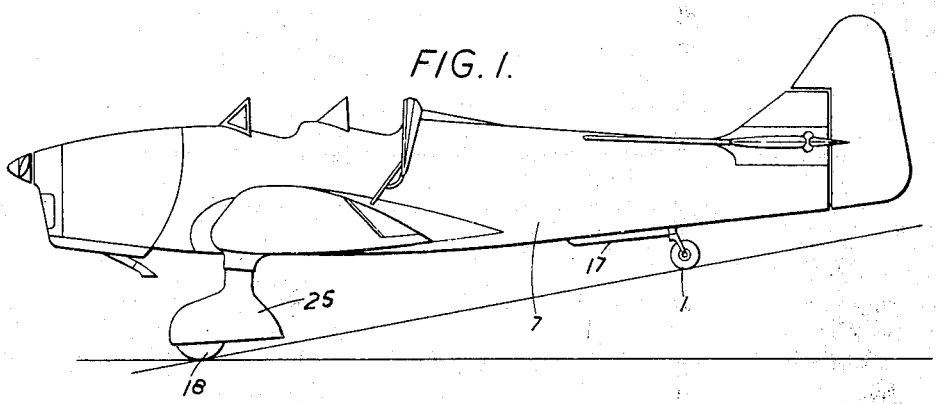
Figure 1 is a side elevation of an aircraft fitted with a tricycle type landing gear in accordance with the invention.

The invention is shown applied to a low wing training type aircraft, the invention enabling such an aircraft to be used for training pupils in the use of a three wheel type undercarriage as disclosed herein and an undercarriage of the orthodox type.

In the construction illustrated, the third wheel I is carried by a wheel fork 2 which is mounted for castoring movement in a vertical or substantially vertically arranged fork bearing 3, the latter being pivotally connected at 4 at its lower end to a forwardly and upwardly inclined radius rod 5 pivotally connected at 6 at its upper end with the fuselage 7 of the aircraft. The fork bearing 3 is also pivotally connected at its upper end at 8 to a forwardly and upwardly inclined link 9 which is pivotally connected at 10 at its upper end to a shock absorber strut 11 of the oleo pneumatic type which is pivotally connected with the radius rod at a point 12 intermediate its length, the former being pivotally connected at its upper end at 13 to the aircraft fuselage. The arrangement of the pivotal points between the radius rod, oleo leg, link and fork bearing results in a substantially parallel link motion being obtained but in order that the castoring movement of the tail wheel shall not be affected by its change of position, it is preferred that the pivotal points shall be so arranged that whatever the position of the tail wheel the wheel fork bearing shall always be disposed at the same, or substantially the same angle to the ground when the tail wheel is in contact with the ground.

In Figure 1, the tail wheel is shown in its fully retracted position, i. e. a position in which the mounting offers a minimum of air resistance. An aircraft having the tail wheel in the position shown in Figure 1 could be taxied or flown off without damage to the tail wheel or mounting but when practising landings with the tail wheel in substantially its retracted position it is preferred that it shall be lowered slightly to a position intermediate the positions shown by dotted lines and chain dotted lines in Figure 2, the tail wheel in that case occupying a substantially orthodox position except for the fact that it is disposed a little more forwardly of the tail surfaces than normally. By lowering the tail wheel slightly in the suggested manner the oleo pneumatic shock absorber strut will operate successfully to absorb the initial shock of landing. When it is desired to take off or land in a position approximating to that of normal level flight, the tail wheel is lowered into the position shown by full lines in Figure 2. The tail wheel can either be lowered in flight or can be allowed to drop a predetermined amount as the tail is lifted under the action of the elevators when taxi-ing.

Figure 2:
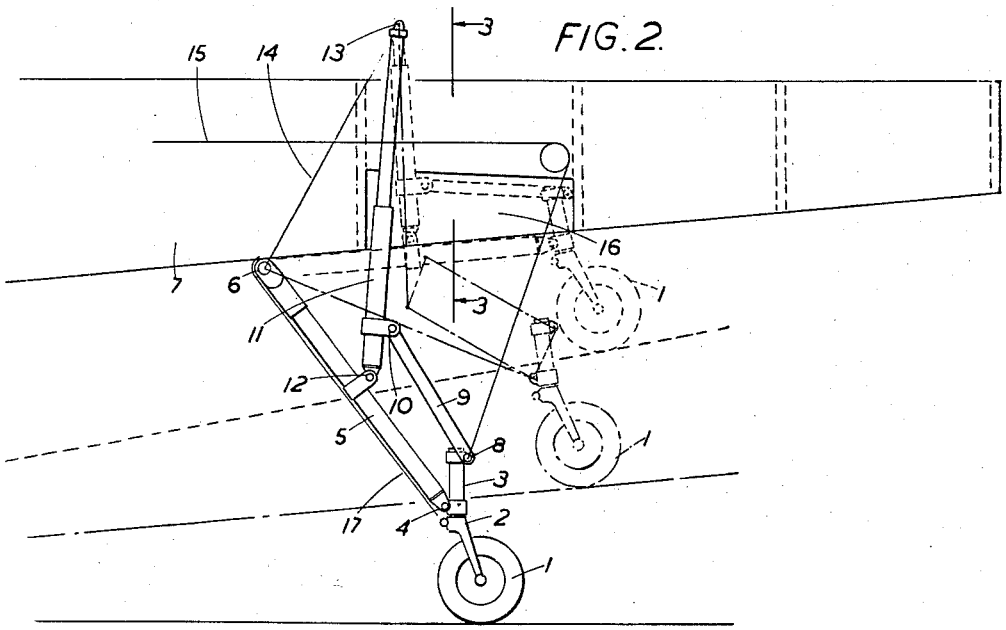
Figure 2 illustrates the construction of the tail wheel unit.

Although an aircraft with the tail wheel in the position shown by full lines in Figure 2 can be flown off satisfactorily, to facilitate take off the tail wheel may be raised into the position shown by chain dotted lines.

The wheel fork bearing preferably incorporates a self-centering cam and rollers of the kind forming the subject of British Patent No. 520,648, whilst the oleo pneumatic leg is preferably of the kind forming the subject of British Patent No. 475,785.

A tie rod 14 is preferably provided connecting the forward pivotal point of the radius rod with the upper end of the oleo leg in order to reduce stresses on the air frame.

Any suitable means may be employed to raise the wheel into its alternative position, but it is preferred to employ a cable 15 or other suitable simple form of retracting mechanism.

By employing an oleo pneumatic leg of the kind forming the subject of British Patent No. 475,785, the telescopic oleo leg can be slowly telescoped during retraction but any sudden impact on the wheel, as when landing, will set up considerable resistance to said telescoping movement and at the same time provide the required shock absorbing effect. Return movement of the wheel to its fully lowered position is brought about by the normal extension of the oleo leg when tension on the lifting cable is relaxed.

To accommodate the mounting when the latter is in its fully retracted position, a well 16 is provided in the fuselage which is adapted to be closed by a fairing 17 attached to the radius rod 5.

Figure 4:
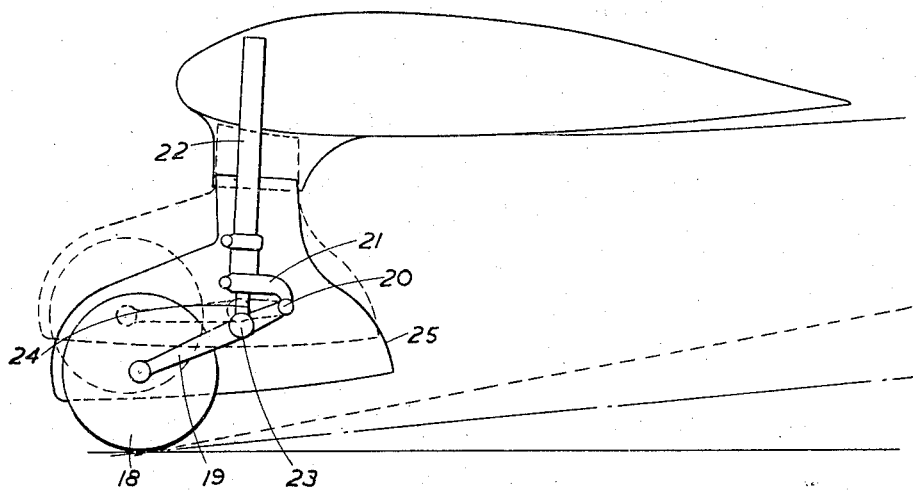
Figure 4 is a sectional view illustrating the modified mounting of one of the main landing wheels.
Figure 3:
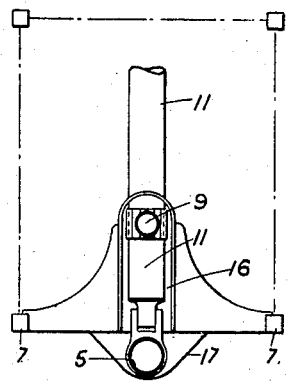
Figure 3 is a vertical section on the line 3—3 in Figure 2, the mounting being in the retracted position shown by dotted lines.

With reference to the main undercarriage, and particularly to Figure 4 of the drawings, each main landing wheel 18 is rotatably mounted upon the forward end of a substantially horizontally arranged arm 19 or wheel fork which is pivotally attached at 20 at its rearward end to a bracket 21 carried by the main undercarriage leg. e. g. the outer casing of a telescopic oleo leg or other shock absorber strut 22, the arm being pivotally connected at 23 at a point intermediate its length with the lower end of a piston rod 24 or other member pivotally connected to a piston or other inner member acting on the shock absorbing fluid. The wheel centres can, therefore, in this way be arranged farther forward of the centre of gravity than is the usual practice, whilst the usual supports for the oleo legs can be retained, this being particularly desirable in an aircraft wherein the undercarriage is attached to the leading spar of the wing.

If fitted with a wheel fairing, the fairing 25 may be attached to the wheel axle and may have a combined pivotal and upward sliding movement about the outer casing of the oleo leg.

In other types of aircraft in which the main undercarriage legs may be attached at points on the aircraft other than to the main wing spar, the undercarriage legs may themselves be moved forwardly into a new position but in any case it is preferred that the main landing wheels shall be moved more forwardly of the centre of gravity of the aircraft to enable the wheel brakes to be firmly applied whilst the aircraft is landing in a substantially horizontal position.

What I claim and desire to secure by Letters Patent of the United States is:

A trainer type aircraft for use in instructing pupils in landing in a "tail down" position or in a "horizontal tail up" position as assumed in the case of an aircraft fitted with landing gear of the kind referred to, and including a tail wheel unit comprising a castoring wheel fork, a radius rod pivotally attached to said aircraft and to said wheel fork, a telescopic oleo-pneumatic shock absorber strut pivotally connected at its upper end to said aircraft and pivotally connected at its lower end to said radius rod at a point intermediate its length, said strut having a stroke sufficiently long to permit of the tail wheel being raised into a position in which the aircraft can be landed in a "tail down" position or lowered into a position in which the aircraft can be landed in a "tail up" position approximating to that assumed during normal level flight, a link pivotally connected to the upper end of said wheel fork and to said shock absorber strut and lying substantially parallel to the latter, the arrangement of radius rod, shock absorber strut, link and wheel fork providing a substantially parallel link motion and serving to maintain said wheel fork at substantially the same angle to the ground irrespective of the extent to which the tail which is raised or lowered and means for raising and lowering said tail wheel into either of its terminal positions or into an intermediate position to facilitate "take off."

LEONARD EUGENE COWEY.